Nov. 13, 1928.   1,691,516

H. V. GLORE

MACHINE FOR MAKING HAIRPINS

Filed Sept. 7, 1926   3 Sheets-Sheet 1

INVENTOR.
Harry V. Glore
BY Townsend, Loftus & Abbett
ATTORNEYS.

Nov. 13, 1928.
H. V. GLORE
1,691,516
MACHINE FOR MAKING HAIRPINS
Filed Sept. 7, 1926
3 Sheets-Sheet 2
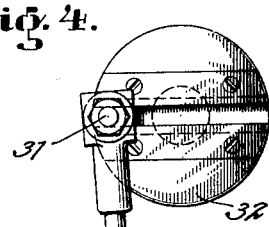
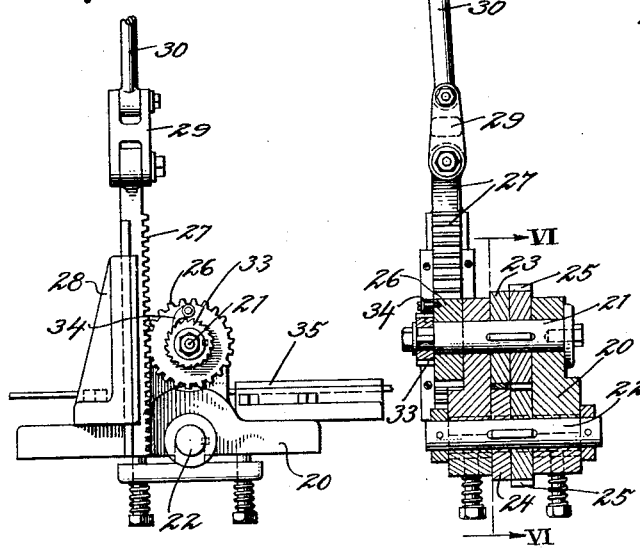
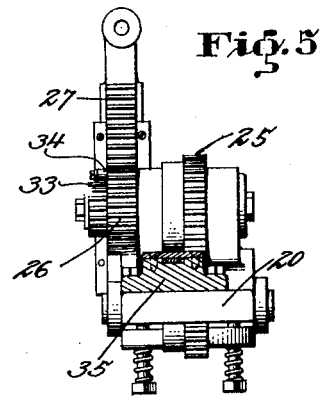
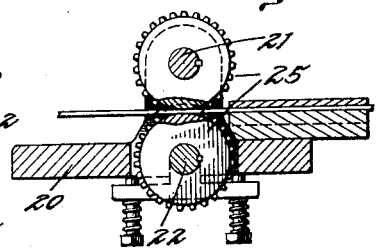
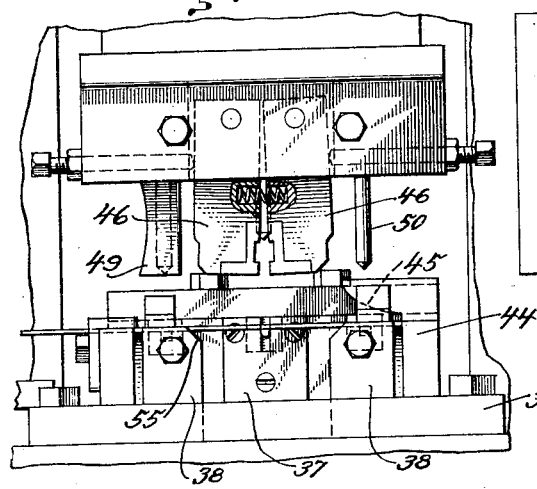
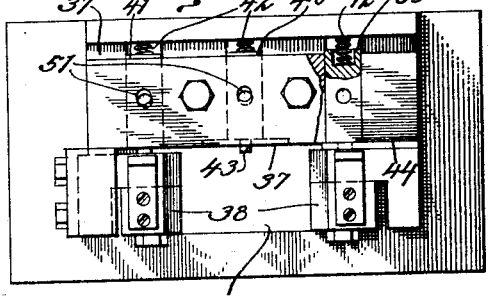
INVENTOR.
Harry V. Glore
BY Townsend Loftus and Abbett
ATTORNEYS.

Nov. 13, 1928. 1,691,516
H. V. GLORE
MACHINE FOR MAKING HAIRPINS
Filed Sept. 7, 1926   3 Sheets-Sheet 3

INVENTOR.
Harry V. Glore
BY Townsend Loftus and Abbett
ATTORNEYS.

Patented Nov. 13, 1928.

1,691,516

UNITED STATES PATENT OFFICE.

HARRY V. GLORE, OF OAKLAND, CALIFORNIA, ASSIGNOR, BY DIRECT AND MESNE ASSIGNMENTS, TO VEITCH MANUFACTURING COMPANY, A CORPORATION OF NEVADA.

MACHINE FOR MAKING HAIRPINS.

Application filed September 7, 1926. Serial No. 133,833.

This invention relates to machines for making hairpins.

It is the principal object of the present invention to provide a simple and efficient machine for making hairpins, which machine is automatic in operation and capable of rapidly producing hairpins of a desired size and shape.

In carrying out this object into practice I provide a machine fitted with a hairpin forming mechanism to which one end of a coil of material is led. This material is fed to the machine automatically in timed relation to the forming mechanism which operates intermittently to cut off and shape the material fed thereto into hairpins.

One form which the invention may assume is exemplified in the following description and illustrated by way of example in the accompanying drawings, in which:

Fig. 3 is a fragmentary view in front elevation of the feed mechanism.

Fig. 4 is a fragmentary view in end elevation of the feed mechanism disclosing a portion of the latter in vertical section.

Fig. 5 is an end elevation of the feed mechanism disclosing the manner in which the material is led from the feed rollers.

Fig. 6 is a fragmentary view in vertical section through the feed mechanism showing the manner in which the feed rollers engage the material.

Fig. 7 is an enlarged view in front elevation of the die mechanism for forming the pin.

Fig. 8 is a plan view of the lower portion of the die mechanism with parts broken away to more clearly disclose certain features of construction.

Referring more particularly to the accompanying drawings, I disclose the mechanism embodying the preferred form of my invention as included in a standard type of press. It is to be understood, however, that the invention may assume other forms without departing from the invention.

Figures 1, 2:
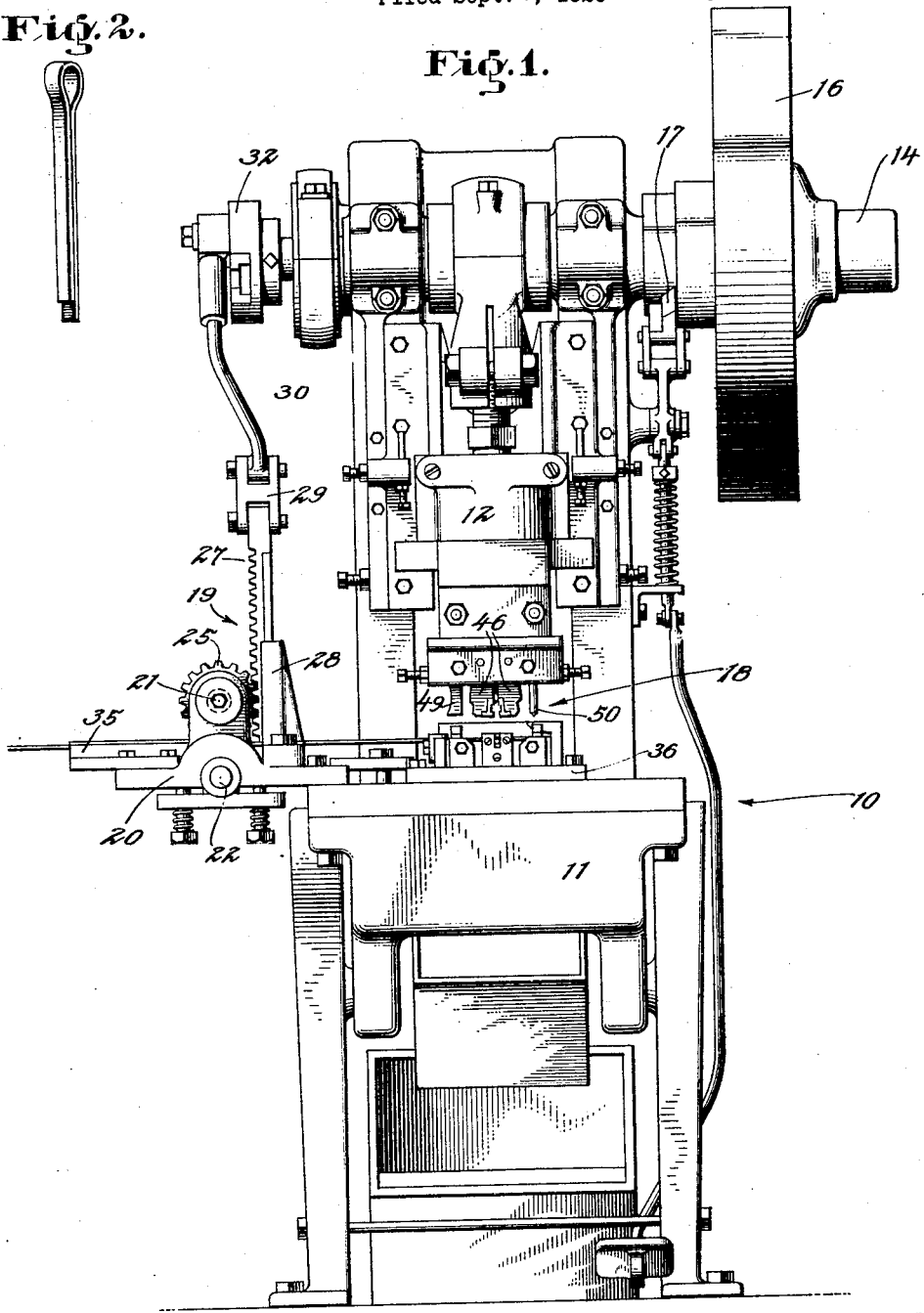
Fig. 1 is a front elevation of a machine embodying the preferred form of my invention.
Fig. 2 illustrates the type of hairpin manufactured by the machine.
Figure 9:
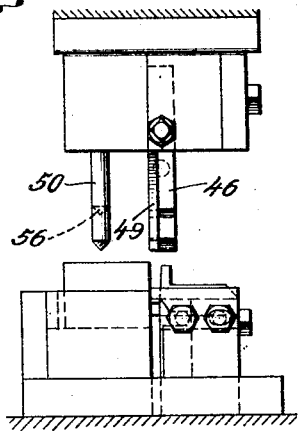
Fig. 9 is an end elevation of the upper and lower die mechanism showing it in raised or inoperative position.

Reference being had to Fig. 1, 10 indicates a press which may be of a standard type having a bed plate 11 and a vertically reciprocable ram 12. This ram 12 is operated and controlled by a crank shaft 14, which may be revolved at a desired speed in any suitable manner. In the present instance the shaft 14 is shown as fitted with a pulley 16 over which a driving belt may be led. During the operation of the machine the shaft 14 revolves continuously at a constant speed. To control the operation of the device, the machine is fitted with a clutch mechanism 17 which is operative to discontinue the driving connection between the shaft 14 and the pulley 16 when desired.

Arranged on the ram and bed plate of the press is a hairpin forming mechanism, indicated by the numeral 18. The ram 12 carries the upper portion of the mechanism, while the bed plate 11 supports the lower portion. It should be stated that upon each complete stroke of the ram a hairpin is completely formed to the shape illustrated in Fig. 2 of the drawings. It is therefore obvious that it is necessary to feed material between the upper and lower portions of the die or mechanism intermediate the successive downward strokes of the ram. In the present instance I have provided an automatic feed for delivering material to the die in timed relation to the operation of the ram. The material used is flat spring wire, which is preferably coiled, the free end of the coil being led to the machine.

Reference being had to Fig. 1, the feed mechanism is indicated by the numeral 19. This feed mechanism comprises a sub-frame 20 which is bolted or otherwise secured to the bed plate 11 of the press. This sub-frame is formed with bearings to receive a pair of shafts 21 and 22, which are arranged horizontally in parallelism one above the other. Secured on the shafts substantially centrally thereof is a pair of feed rollers 23 and 24, the peripheries of which are in alignment and closely adjacent so that the free end of the wire material may be led therebetween and fed to the machine upon rotation of the rollers.

It will be noticed from the drawings that the shaft 22 floats in its bearings so that the lower feed roll may be yieldingly pressed upward to cause frictional engagement between the rollers and the wire led therebetween. It is intended that these rollers be intermittently operated to feed the wire between the upper and lower portions of the forming device in synchronism with the operation of the ram.

To accomplish this a pair of meshing spur gears 25 are keyed on the shafts 21 and 22. At one end of the shaft 21 a spur gear 26 is loosely mounted in mesh with a vertically reciprocable rack 27. This rack is guided for vertical reciprocation in a guide 28 carried by the sub-frame 20. The upper end of this rack is pivotally connected to a link 29, which in turn is pivotally connected to the lower end of a connecting rod 30. The upper end of this connecting rod is pivotally mounted on a crank pin 31, which is eccentrically secured on a crank disk 32. This crank disk is keyed on the drive shaft 14 of the press, so that the connecting rod 30 will reciprocate in synchronism with the ram. When the shaft 14 is driven, it will through the medium of the crank disk 32 and the crank pin 31 vertically reciprocate the rack 27 by means of the connecting rod 30. This reciprocation of the rack 27 will be translated into rotary movement of the gear 26 on the shaft 21. As the motion of the rack is constant, it will revolve the gear 26 alternately in opposite directions.

It being intended that the feed rollers 23 be driven in one direction only and at spaced intervals, I provide mechanism which causes the rack to revolve the shaft 21 on the downward stroke only. This mechanism includes a ratchet gear 33, which is secured on the shaft 21 contiguous to the gear 26. A pawl 34 is mounted on the gear 26 and is adapted to engage the ratchet 33, and impart rotation thereto and to the shaft 21 upon the downward stroke of the rack 27. On the upward stroke of the rack 27, the pawl does not effect a driving engagement between the gear 26 and the ratchet and consequently the feed rollers 23 and 24 remain idle during the upward stroke of the rack. The stroke of the rack is sufficient to revolve the feed rollers 23 an amount necessary to deliver the proper amount of material to the forming device and position it to be operated upon by the forming device. To aid in guiding the wire material to the forming device a guide 35 is provided through which the free end of the wire extends as it emerges from between the feed rollers 23 and 24.

Reference being had to Figs. 7 and 8 it is seen that the forming device includes a shoe 36 which is bolted on the bed plate and supports the lower portion of the die. This lower portion includes a guide block 37 arranged at the rear, and a pair of cams 38 which are arranged upon opposite sides of the center at the front of the guide block 37. The guide block 37 is fitted with three supporting members 39, 40 and 41. The members 39 and 41 are disposed at opposite ends of the guide block, while the member 40 is disposed centrally thereof. These supporting members 39, 40 and 41 are reciprocably mounted in the guide block 37 and are normally held in forward positions by means of springs 42. At their forward ends these guide members 39, 40 and 41 are provided with pins 43 which project outwardly a short distance or the distance equal to the spacing between the guide block 37 and the cams 38, against the latter of which they abut. This spacing between the guide block 37 and the cams 38 is just slightly greater than the width of wire material of which the hairpin is formed. The wire material from the feed mechanism 19 is led between the guide block 37 and the cams 38 as shown in Fig. 7 and in this position will be supported by the pins 43 of the supporting members 39, 40 and 41.

When in position to be operated upon, the free end of the wire material abuts against a stop member 44. This stop member 44 has a projection 45, the under surface of which is curved so as to properly guide the end of the wire into position upon the pins 43. After the material has been fed into position the ram 12 descends to the position illustrated in Fig. 10.

It will be noticed that the upper portion of the die includes a pair of forming jaws 46, which are located upon opposite sides of the center. These jaws are pivotally suspended from the upper portion or head 47 of the die and are held outwardly by means of springs 48 disposed intermediate the jaws 46. When the die descends to forming position, these jaws operate to form the pin. Intermediate the jaws and the feed mechanism the die head 47 carries a shear blade 49 which is adapted to cut off the material from the free end of the wire roll.

Figure 10:
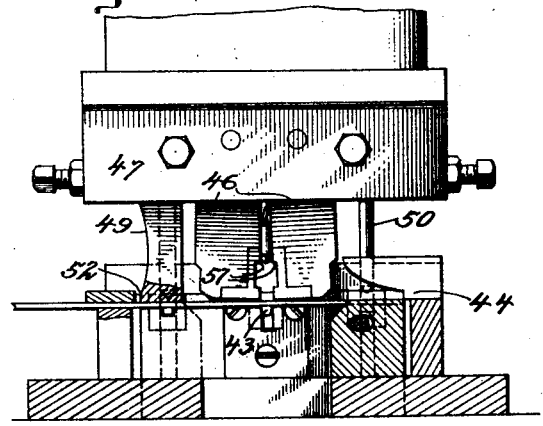
Fig. 10 is a front elevation of the die mechanism with the lower portion thereof in section and disclosing the die in a position cutting off the material just prior to shaping the pin.
Figure 11:
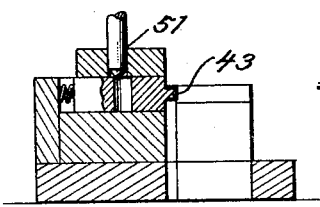
Fig. 11 is a vertical section through the lower die mechanism disclosing the manner in which the supporting pins are actuated.

When the ram carrying the die head descends to the position shown in Fig. 10, the wire within the die is clamped against the center pin 43 of the supporting member 40. At this point the pins 43 carried by the supporting members 39 and 41 are withdrawn. This is accomplished by means of retracting members 50 located at opposite ends of the die head. These retracting members 50 have tapered lower ends, which are adapted to project through guide openings 51 formed in the top of the guide block 37. The guide members 39 and 41 are formed with similar holes, which are disposed when the members 39 and 41 are in forward position, slightly out of alignment with the guide openings 51.

However, when the retracting members 50 project through the openings 51 their tapered lower ends engage the openings in the members 39 and 41 and retract them a distance sufficient to withdraw the supporting pins 43 carried thereby to a position within the guide block 37, leaving the opposite ends of the wire of which the pin is to be formed unsupported.

As stated, however, the wire is supported at its center between the central pin 43 and the jaws 46. As the die head descends further the shear blade 49 shears the material at the point indicated by the numeral 52. As the die head further descends the ends of the jaws 46 cause the opposite ends of the billet of the material in the die to bend downwardly about the center pin 43. As the jaws 46 descend, they engage the cams 38 and move inwardly toward each other.

Figure 12:
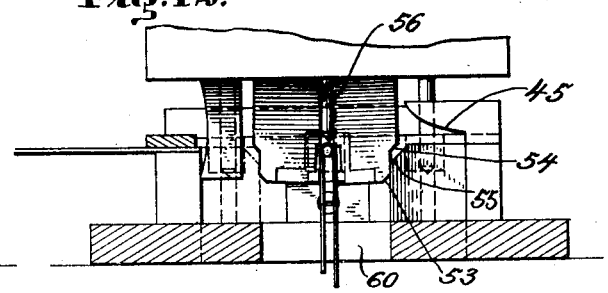
Fig. 12 is a front elevation of the die mechanism disclosing the position thereof during the forming operation.
Figure 14:
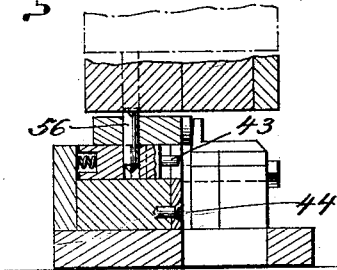
Fig. 14 is a vertical section through the die mechanism taken on line XIV—XIV of Fig. 13.

For this purpose the jaws are formed with two cam surfaces 53 and 54, which engage cam surfaces 55 formed on the cams 38. When the cam surfaces 53 on the jaws engage the cam surfaces 55 on the cams 38, the jaws are moved inwardly a slight distance, as shown in Fig. 12, to bend the legs of the pin parallel. When this position of the die head is reached a retracting member 56 engages the center supporting member 40 and retracts the pin carried thereby from engagement with the pin being formed. During this time the pin will be frictionally held between the jaws and by an abutment member 57, extending transversely between the jaws. This abutment member prevents the pin from creeping upwardly during its forming operation.

Figure 13:
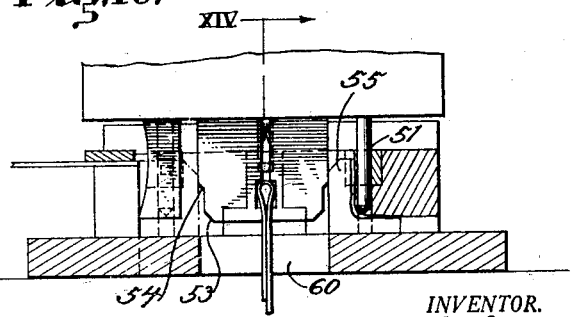
Fig. 13 is a front elevation of the die mechanism with parts in section disclosing the position of the die after completing the forming operation.

During the time interval necessary to withdraw the supporting pin 43 of the member 40, a rest period is provided for the jaws 46. Just after the pin 43 is withdrawn, the cam surfaces 54 on the jaws 46 engage the cam surfaces 55 on the cams 38 and crimp the pin, as shown in Fig. 13. This crimping action takes place at the end of the stroke of the ram, and is sufficient to place the legs of the hairpin in parallelism and in contact for a major portion of their length.

It will be noticed that the meeting surfaces of the jaws are recessed slightly just above their lower ends, so as to accommodate the eye of the pin. When the bottom of the stroke has been reached the ram withdraws upwardly and the jaws release the pin, which drops through an opening 60 in the shoe to a chute or other device suitable to convey it to a receiving container. As the ram moves upwardly the feed mechanism commences operation to feed the wire into position for a successive operation.

In operation of the device a coiled wire is arranged on a spindle and its free end is inserted between the feed rollers into position between the upper and lower portions of the die, it being assumed that this takes place after the die has commenced its downward stroke. Upon its downward stroke the supporting pins 43 at the ends of the die are first retracted and the shearing blade 49 then cuts the material to the proper length. The die head then descends and the jaws 46 bend the opposite ends of the pin into parallel relation, as shown in Fig. 12. When this position is reached the center supporting pin, about which the eye of the hairpin is formed, is retracted and the jaws descend further and are moved together to crimp the pin as shown in Fig. 13.

When the pin is properly formed the lower end of the stroke is reached and the ram commences to move upwardly. This upward movement of the ram will be accompanied by separation of the jaws and the release of the pin, which may drop into a proper receptacle. After the ram is moved upwardly an amount to clear the die, the feed mechanism commences operating and will feed a new billet of wire into proper position in the die. This feeding operation is completed shortly after the ram commences its downward stroke, so that the feed mechanism remains idle during the forming operation.

It should be stated that the operating stroke of the rack 27 of the feed mechanism is sufficient to feed the proper amount of material to the die and to properly position it with respect to the operating elements thereof.

It is to be understood that the crank shaft of the press is continuously revolved during the operation of the machine, and that the cutting off and forming of the pin is accomplished in a single downward stroke of the ram. This enables the device to very rapidly form the hairpins from the spool of wire. In actual practice I have found a machine of this type capable of producing from between one hundred and twenty-five to two hundred and fifty pins per minute.

From the foregoing it is obvious that I have provided a comparatively simple mechanism for rapidly producing hairpins which mechanism is very efficient and is not liable to become out of order or need of repairs.

While I have shown the preferred form of my invention, it is to be understood that various changes may be made in its construction by those skilled in the art, without departing from the spirit of the invention, as defined in the appended claims.

Having thus described my invention, what I claim and desire to secure by Letters Patent is:

1. A die for forming a hairpin comprising a stationary die part, a reciprocable die part, supporting means for supporting a billet of material intermediate the die parts in position to be operated upon thereby, cooperative means on the die parts for shearing the material to proper length, removing the supporting means and forming the hairpin in a continuous operation.

2. A hairpin forming die including a stationary die part having means for supporting a billet of material in a position to be operated upon, a reciprocable die part adapted to cooperate with the stationary die part, shearing means on the reciprocable die part and the stationary die part for shearing the material to proper length, cooperative forming means on the reciprocable die part and the stationary die part for forming the hairpin subsequent to the shearing of the material, and cooperative means on the die parts for withdrawing the supports for the material as the shearing and forming operations proceed.

3. A hairpin forming die comprising a stationary die part upon which a length of material to be formed may be disposed, supports for said material adapted to support the same at its opposite ends and center, cooperative shearing means on the die parts to shear said material to the proper length, cooperative means on the die parts for withdrawing said end supports just prior to the shearing operation, a pair of pivotal forming members adapted to engage the material as it is sheared and press it against said center support, cam means on said forming members and said stationary die part for bending the ends of said material in parallelism about the center support, cooperative means on the die parts for withdrawing the center support when said ends of the wire are bent in parallelism, cam means on said forming members and said stationary die part for crimping the hairpin and placing the legs thereof in intimate contact immediately upon withdrawal of said center support, said operations occurring during a single stroke of the reciprocable die part toward the stationary die part, and means for causing said forming members to release the formed pin immediately after the reciprocable die part completes its operating stroke and commences to withdraw from the stationary die part.

4. A hairpin forming die comprising a stationary die part upon which a length of material to be formed may be disposed, a center support to support the material at its center, a pair of pivotal forming members adapted to engage the material and press it against said center support, cam means on said forming members and said stationary die part for bending the ends of said material in parallelism about said center support, cooperative means on the die parts for withdrawing the center support when the ends of the material are bent in parallelism, cam means on said forming members and said stationary die part for crimping the hairpin and placing the legs thereof in intimate contact immediately upon withdrawal of said center support, said operation occurring during a single stroke of the forming members toward the stationary die part.

5. A hair pin forming die comprising a stationary die part upon which a length of material to be formed may be disposed, a center support to support the material at its center, a pair of pivotal forming members adapted to engage the material and press it against said center support, cam means on said forming members and said stationary die part for bending the ends of said material in parallelism about said center support, cooperative means on the die parts for withdrawing the center support when the ends of the material are bent in parallelism, cam means on said forming members and said stationary die part for crimping the hairpin and placing the legs thereof in intimate contact immediately upon withdrawal of said center support, said operation occurring during a single stroke of the forming members toward the stationary die part, and means for causing said forming members to release the formed pin immediately after the reciprocable die part completes its operating stroke and commences to withdraw from the stationary die part.

HARRY V. GLORE.